3,660,558
DETERMINATION OF CAPACITATION OF SPERM EMPLOYING A FLUORESCENT FORM OF TETRACYCLINE
Ronald J. Ericsson, Kalamazoo, Mich., assignor to The Upjohn Company, Kalamazoo, Mich.
No Drawing. Continuation-in-part of application Ser. No. 639,318, May 18, 1967. This application May 11, 1970, Ser. No. 36,446
Int. Cl. G01n 31/22
U.S. Cl. 424—7
4 Claims

ABSTRACT OF THE DISCLOSURE

A complex of mammalian sperm with an effective amount of a fluorescent form of a tetracycline for imparting to the complex fluorescence during absorption of ultraviolet or ultraviolet-blue light is used in a method of diagnosing sperm capacitation. The method consists essentially of placing the complex in the mammalin uterus in vivo for a period of from about 2 to about 8 hours, removing the complex from the uterus, and determining the presence or absence of fluorescence in the removed complex.

CROSS REFERENCE TO RELATED APPLICATIONS

This is a continuation-in-part of copending application Ser. No. 639,318, filed May 18, 1967, now abandoned.

BRIEF SUMMARY

This invention relates to a pharmaceutical preparation and its use in determining capacitation of mammalian sperm. It has been found in accordance with the present invention that a simple efficient method of diagnosing capacitation utilizes the ability of mammalian sperm to bind with a fluorescent form of tetracycline and provide a complex which gives off fluorescence when activated by ultraviolet or ultraviolet-blue light.

DETAILED DESCRIPTION

Capacitation refers to the ability of sperm to penetrate and fertilize susceptible ova. Such penetration and fertilization requires not only potentiality of the sperm in this regard but also propitious conditions must exit in the uterine environment. Under favorable conditions in the mammalian uterus, in vivo, sperm are capacitated, penetration of ova can occur, and gastation can begin. A non-receptive uterus, that is, one with an unfavorable environment, does not favor capacitation; in fact such a uterus even reduces and negates it to the extent of showing infertility in the female. For example, in the luteal phase-uterus (pseudopregnacy) sperm fluorescence of the complex is retained. Any loss of fluorescence therein shows the absence of functioning corpora lutea needed for maintenance of pregnancy. Determination of cleavage in recovered ova provides an accurate measure of capacitation, but such a technique is very time consuming. Hence, there is a need for simpler and quicker determination of capacitation. According to the present invention it has been found that tetracycline-labeled sperm lose fluorescence under uterine conditions where sperm can capacitate and retain this fluorescence when the conditions do not favor capacitation.

As used herein the term "mammalian sperm" means human and animal sperm, for example boar, bull, and rabbit sperm. The term "fluorescent form of tetracycline" means those tetracyclines known to those skilled in the art, for example tetracycline, oxytetracycline, chlortetracycline, demethylchlortetracycline, rolitetracycline, pyrrolidinomethyltetracycline, dehydrotetracycline, and like tetracycline compounds. The tetracycline is used in soluble form, e.g., hydrochloride, phosphate, sulfate, acetate, succinate, cyclohexanesulfamic, benzenesulfonic, and like salts. The ability to fluoresce is easily determined by exposure to ultraviolet or ultraviolet-blue light by technique known in the art.

By way of general description, the present invention involves collection of semen by methods known to those skilled in the art, and if desirable, checking the semen sample for percent and degree of sperm motility within about six hours post-collection. The number of sperm in a sample is determined by counting with a hemacytometer. The manner and process of making the complex of the fluorescent form of tetracycline and the sperm is not critical. Contacting the sperm with the fluorescent form of the tetracycline at about 25° C. by mixing in seminal fluid or a physiological vehicle the sperm and the form of tetracycline suffices to label the sperm with the tetracyline. The tetracycline is bound to the sperm in an unknown manner; however, the binding is such that the tetracycline is not removed by suspending the labeled sperm in a physiological vehicle such as Tyrode's solution, Locke's solution, Ringer's solution, or physiological saline. Illustratively, the fluorescent form of the tetracycline is dissolved in a physiological vehicle such as 0.9% saline, Ringer, Krebs-Ringer phosphate, or Tyrode's solution and the so-prepared solution is mixed at ambient temperature with rabbit, boar, or human semen for from about 10 to about 30 minutes. Thereafter, the tetracycline-labeled sperm is separated from the liquid phase, preferably at the centrifuge. The recovered labeled sperm is then resuspended in one of the aforesaid physiological vehicles, preferably Tyrode's solution, and the so-prepared suspension is used for introduction into the mammalian uterus in vivo. The aforesaid procedure is operable for both motile, that is, live sperm, and for dead sperm. However, in the case of dead sperm, where retention of motility is not a factor, the dead sperm is usually separated from seminal fluid at the centrifuge, resuspended in one of the aforesaid vehicles, and then complexed with a solution of the tetracycline as herein before described. In this manner, tetracycline-labeled dead sperm are prepared and are available for in vivo use in utero when suspended in one of the aforesaid physiological vehicles. The amount of tetracycline must be sufficient to give fluorescence to the labeled motile or dead sperm and excess tetracycline is easily removed at the centrifuge. However, illustrative operative relationships of sperm and tetracycline are from about 1 to about 10 micrograms of the latter, preferably tetracycline hydrochloride, per $10^6$ sperm. The time of labeling is not critical. As little as a minute or so to about 10 minutes suffices, and longer times of contact are unnecessary to provide proper labeling. Sterile Tyrode's solution at a concentration of 3 mg./ml. is preferred as the vehicle for the tetracycline, but similar vehicles, e.g., Locke's solution, Ringer's solution, can be used. Illustratively, the complex is separated from seminal fluid at the centrifuge, preferably for 10 minutes at about 3,000 revolutions per minute. The fluid is removed from the complex as by pouring off or decantation. This removes the seminal fluid and any excess of the tetracycline compound. Thereafter, the complex is well mixed with sterile Tyrode's solution utilizing about 0.1 ml. to about 10 ml. This suspension of the complex is introduced into the mammalian uterus, especially a proliferative uterus, for example through the cervix with the aid of a sterile pipette. At about 2 to about 8 hours later the sperm is recovered by uterine lavage, that is, additional sterile Tyrode's solution is introduced into the uterus and then the fluid and sperm mixture is aspirated as a recovery measure. From about 0.5 to about 100 ml. of the Tyrode's solution is used, dependent upon the particular species. The recovered complex is checked for motiliyt, if desired, and fluorescence of either the motile or nonmotile sperm is determined with the aid of a fluorescenct microscope, preferably with a dark field condenser. Wave length can be either that of the ultraviolet or ultraviolet-blue. This illustration has been described in reference to the use of live mammalian sperm. However, dead mammalian sperm can be utilized, especially if it is considered desirable that the host providing the proliferative uterus not become impregnated. In the case of the dead mammalian sperm, it is not as important to quantitate the amount of tetracycline because the sperm motility is not involved. In this case, also, the seminal fluid can be centrifuged away from the sperm, the sperm resuspended in vehicle and then the complex prepared with the form of tetracycline as heretofore. In this case, also, the excess tetracycline and its liquid vehicle are removed by a second separation at the centrifuge before use of the labeled sperm in utero.

Twenty to fifty$\times 10^6$ tetracycline-labeled sperm complex is injected through a 25-gauge needle into each uterine horn (.25 ml.) and in some experiments $10\times 10^6$ sperm in each oviduct (.10 ml.). Laparotomy is performed under sodium pentobarbital and ether anesthesia. In one experiment 10% of the T-HCl bound to sperm was labeled with tritium.

Each uterine horn is clamped at both ends and 1.0 ml. of Tyrode's solution injected into the lumen and after manual manipulation the fluid is recovered in a syringe; oviducts are flushed with 0.25 ml. of Tyrode's solution. Recovered sperm complex is checked for fluorescence, motility and number. Sperm fluorescence is determined at 320 magnification with a Leitz Ortholux microscope equipped with a high pressure mercury vapor lamp. The microscope is also fitted with a BG 12 fluorescence filter for UV-blue light and a darkfield condensor.

EXAMPLE 1

Amounts of sperm and vehicle

| Species | Sperm deposited in uterus | Tyrode's with sperm suspended for deposit, ml. | Tyrode's for sperm recovery, ml. |
|---|---|---|---|
| Human | [1] 100–500$\times 10^6$ | 0.2–1.0 | 0.5–5.0 |
| Bovine | 100–1,000$\times 10^6$ | 0.5–3.0 | 25–100 |
| Equine | 100–1,000$\times 10^6$ | 0.5–3.0 | 25–100 |
| Ovine | 100–1,000$\times 10^6$ | 0.5–3.0 | 10–50 |
| Porcine | 100–1,000$\times 10^6$ | 0.5–10.0 | 25–100 |
| Canine | 100–1,000$\times 10^6$ | 0.1–5.0 | 10–50 |

[1] Entire ejaculate or,

EXAMPLE 2

Capacitation of rabbit and human sperm as measured by removal of tetracycline HCl from complex

| Number of does | Location | Sperm fluorescence |
|---|---|---|
| | Rabbit sperm | |
| 25 | Uterus (estrus) | None. |
| 2 | Uterus (day 3 pseudopregnant) | Do. |
| 17 | Uterus (day 7–9 pseudopregnant) | Bright. |
| 6 | Oviduct (estrus) | None. |
| 3 | Oviduct (pseudopregnant) | Do. |
| | Human sperm | |
| 3 | Uterus (estrus) | Do. |
| 2 | Uterus (day 8 pseudopregnant) | Weak. |

EXAMPLE 3

Capacitation of sperm recovered from uteri of estrous and pseudopregnant rabbits and inseminated in oviducts of recipient rabbits The left oviduct received complex from estrous does and the right complex from pseudopregnant does. The does were induced to ovulate by injection of chorionic gonadotropin 12 hours before insemination. Ova were recovered approximately 24 hours later.

| Number of recipient oviducts | Sperm recovered from and (fluorescence) | Average number sperm inseminated | Number Ova Recovered | Cleaved |
|---|---|---|---|---|
| | Trial I | | | |
| 6 | Estrous uterus (none) | 31,000 | 16 | 5(31.3%) |
| 7 | Pseudopregnant uterus (bright) | 99,000 | 14 | 1(7.1%) |
| | Trial II | | | |
| 7 | Estrous uterus (none) | 47,000 | 20 | [1] 14(70.0%) |
| | Pseudopregnant uterus (bright) | 148,000 | 19 | 0(0.0%) |

[1] 4 and 8-cell stage of cleavage.

EXAMPLE 4

Areas of placement of labeled complex

Labeled complex placed in various regions of an estrous doe had on recovery the following degrees of fluorescence:

| | |
|---|---|
| Oviducts and uterine horns | None |
| Eye chamber | Weak |
| Appendix | Weak |
| Dialysis bag in peritoneal cavity | Bright |
| Serum | Bright |
| Dialysis bag in uterine horn, estrous doe | Bright |
| In contralateral uterine horn, estrous doe | None |

EXAMPLE 5

Flourescence and radioactivity of $^3$H-tetracycline HCl-labeled rabbit sperm recovered from estrous and pseudopregnant uteri

| Doe Number | Condition | Sperm fluorescence | DPM/$10^6$ sperm |
|---|---|---|---|
| 1 | Estrus | None | 123 |
| 2 | do | do | 35 |
| 3 | Day 8 pseudopregnant | Bright | 20,595 |
| 4 | Day 8 pseudopregnant in vitro control. | do | 7,966 |
| | | do | 27,302 |

EXAMPLE 6

Other tetracyclines

Other soluble forms of fluorescent tetracycline are complexed with sperm by substituting the other tetracyclines, for example oxytetracycline, chlortetracycline, dehydrotetracycline and the like in salt form for the tetracycline hydrochloride. Similar results are obtained upon placement of the resulting complexes in mammalian uteri, in the proliferative (estrous) and luteal (pseudopregnant) phases.

I claim:
1. A process of determining capacitation of motile mammalian sperm in utero comprising:
   (a) Introducing into a mammalian uterus in vivo a pharmaceutical preparation consisting essentially of (1) a compatible liquid vehicle selected from the group consisting of physiological saline, Krebs-Ringer solution, Tyrode's solution, Locke's solution and Ringer's solution and (2) motile mammalian sperm labeled with an effective amount of a fluorescent form of a tetracycline for imparting fluorescence thereto by mixing the sperm and the tetracycline in seminal fluid or the said vehicle of (1),
   (b) after a period of from about 2 hours to about 8 hours, removing the sperm from the uterus by uterine lavage or aspiration, and
   (c) examining the removed sperm for fluorescence to ultraviolet or ultraviolet-blue light.
2. The process of claim 1 wherein the fluorescent form of tetracycline is tetracycline hydrochloride.
3. A process of determining uterine condition for capacitation of mammalian sperm comprising:
   (a) Introducing into a mammalian uterus in vivo a pharmaceutical preparation consisting essentially of (1) a compatible liquid vehicle selected from the group consisting of physiological saline, Krebs-Ringer solution, Tyrode's solution, Locke's solution and Ringer's solution and (2) dead mammalian sperm labeled with an effective amount of a fluorescent form of a tetracycline for imparting fluorescence thereto by mixing the sperm and the tetracycline in seminal fluid or in the said compatible liquid vehicle of (1),
   (b) after a period of from about 2 hours to about 8 hours, removing the sperm from the uterus by uterine lavage or aspiration, and
   (c) examining the removed sperm for fluorescence to ultraviolet or ultraviolet-blue light.
4. The process of claim 3 wherein the fluorescent form of tetracycline is tetracycline hydrochloride.

References Cited

UNITED STATES PATENTS 2,944,541   7/1960   Sacchi et al. _____ 128—1

OTHER REFERENCES

Sandlow et al.: J.A.M.A., vol. 189, No. 5 (1964), pp. 363–365.

ALBERT T. MEYERS, Primary Examiner

V. D. TURNER, Assistant Examiner

U.S. Cl. X.R.

424—9